(12) United States Patent
Gibson

(10) Patent No.: US 10,939,670 B2
(45) Date of Patent: Mar. 9, 2021

(54) BEEHIVE FRAME STABILIZATION DEVICE

(71) Applicant: Key Partners Group Inc., Auburn, IN (US)

(72) Inventor: Wallace Edward Gibson, Auburn, IN (US)

(73) Assignee: Key Partners Group, Inc., Auburn, IN (US)

( * ) Notice: Subject to any disclaimer, the term of this patent is extended or adjusted under 35 U.S.C. 154(b) by 220 days.

(21) Appl. No.: 16/261,210

(22) Filed: Jan. 29, 2019

(65) Prior Publication Data

US 2020/0236910 A1  Jul. 30, 2020

(51) Int. Cl.
*A01K 47/02* (2006.01)

(52) U.S. Cl.
CPC .................................. *A01K 47/02* (2013.01)

(58) Field of Classification Search
CPC ........ A01K 47/00; A01K 47/02; A01K 47/06; F16B 5/0024; F16B 5/0088; F16M 13/02
USPC ............... 449/3, 35, 42, 50, 57; 248/220.31, 248/220.21, 220.41, 309.1; 211/59.1
See application file for complete search history.

(56) References Cited

U.S. PATENT DOCUMENTS

| 32,217 | A | * | 4/1861 | Whitney | A01K 47/00 449/36 |
|---|---|---|---|---|---|
| 36,088 | A | * | 8/1862 | Harper | A01K 47/02 449/37 |
| 349,078 | A | * | 9/1886 | Betsinger | A01K 47/02 449/37 |
| 491,669 | A | * | 2/1893 | Stephens | A01K 47/02 449/42 |
| 510,751 | A | * | 12/1893 | Wolworth | A01K 47/00 449/36 |
| 557,532 | A | * | 4/1896 | Aldrich | A01K 47/02 449/37 |
| 1,073,458 | A | * | 9/1913 | Anderson | A01K 47/06 449/25 |
| 1,370,775 | A | * | 3/1921 | Bacon | A01K 47/00 449/37 |
| 1,440,090 | A | * | 12/1922 | Littlefield | A01K 47/02 449/37 |
| 1,472,795 | A | | 11/1923 | Frater | |
| 1,476,453 | A | | 12/1923 | McKay | |
| 1,650,170 | A | * | 11/1927 | Weaver | A01K 47/02 449/45 |
| 1,787,840 | A | * | 1/1931 | Schmidt | A01K 47/02 449/45 |
| 1,929,648 | A | * | 10/1933 | Phillips | A01K 47/02 449/37 |
| 1,947,706 | A | | 2/1934 | Frater | |

(Continued)

OTHER PUBLICATIONS https://www.amazon.com/Modket-M4321-635-NI-100-Bracket-Cabinet-Support/dp/B0757BPXLM/ref=sr_1_7?c=ts&dchild=1&keywords=Shelf+Pegs+%26+Pins&qid=1603466050&refinements=p_n_feature_twenty_browse-bin%3A3267902011&s=hardware&sr=1-7&ts_id=9628895011 (Aug. 30, 2017) (Year: 2017).*

*Primary Examiner* — Magdalena Topolski
*Assistant Examiner* — Shada Mohamed Alghailani
(74) *Attorney, Agent, or Firm* — Taylor IP, P.C.

(57) ABSTRACT

A beehive including a plurality of hive bodies including a base hive body and at least one upper hive body. There are a plurality of frames positioned in each hive body with a pinning device coupled to a hive body. The hive body has a plurality of holes spaced along a side of the hive body. The pinning device is inserted through at least one of the holes to contact a frame inside the hive body to thereby inhibit shifting of the frame relative to the hive body.

13 Claims, 5 Drawing Sheets

(56) References Cited

U.S. PATENT DOCUMENTS

| | | | |
|---|---|---|---|
| 1,968,405 A | 7/1934 | Kouba | |
| 2,269,829 A * | 1/1942 | Schaefer | A01K 47/02 449/37 |
| 2,300,772 A | 11/1942 | Borland | |
| 2,400,807 A * | 7/1945 | Burkard | |
| 2,446,346 A | 8/1948 | Stoller | |
| 2,580,282 A * | 12/1951 | Colley | A01K 47/02 449/37 |
| 2,585,304 A * | 2/1952 | Evans | A01K 47/06 403/241 |
| 2,766,958 A * | 8/1952 | Levy | |
| 2,811,727 A * | 11/1957 | Faske | A01K 47/06 449/21 |
| 3,187,353 A * | 6/1965 | Ackerman | A01K 47/02 449/17 |
| 3,498,409 A * | 3/1970 | Meyer | A63B 27/00 182/92 |
| 3,722,843 A * | 3/1973 | Enckler | |
| 3,820,177 A * | 6/1974 | Croan | A01K 47/02 449/37 |
| 4,094,415 A * | 6/1978 | Larson | |
| 4,415,061 A * | 11/1983 | Meyer | A63B 27/00 182/92 |
| 4,583,308 A * | 4/1986 | Taub | |
| 4,867,272 A * | 9/1989 | Troubridge | A63B 27/00 182/92 |
| 5,553,352 A * | 9/1996 | Bolton | E05D 7/1005 16/229 |
| 5,924,579 A * | 7/1999 | DuPont et al. | |
| 6,279,862 B1 * | 8/2001 | Gershowitz | |
| 7,017,449 B1 * | 3/2006 | Ritchings | B25B 13/5091 182/92 |
| 8,596,588 B1 * | 12/2013 | Sikkema | H02G 3/30 248/58 |
| 8,739,982 B2 * | 6/2014 | Werner | A47B 81/005 211/64 |
| 8,863,900 B1 * | 10/2014 | Bolinger | E06C 9/04 182/90 |
| D747,895 S * | 1/2016 | Florek | A47F 5/08 D6/552 |
| D775,477 S * | 1/2017 | Corless | D6/320 |
| 9,962,016 B1 * | 5/2018 | Johnson | A47F 5/0068 |
| D878,831 S * | 3/2020 | Rortvedt | D6/676 |
| 2001/0013567 A1 * | 8/2001 | Valalius | |
| 2003/0080265 A1 * | 5/2003 | Valiulis | |
| 2007/0205167 A1 * | 9/2007 | Belokin | A47F 5/0018 211/75 |
| 2007/0232189 A1 | 10/2007 | Hamby | |
| 2007/0290107 A1 * | 12/2007 | Lang | A47F 5/0815 248/220.31 |
| 2009/0224119 A1 * | 9/2009 | Heffernan | A47B 96/066 248/225.11 |
| 2010/0213333 A1 * | 8/2010 | Mejia | A47G 1/20 248/220.21 |
| 2011/0056897 A1 * | 3/2011 | Kao | A47F 7/0028 211/70.6 |
| 2013/0273807 A1 * | 10/2013 | Petro | A01K 53/00 449/11 |
| 2015/0049919 A1 * | 2/2015 | Humal | G06T 7/0012 382/110 |
| 2015/0090676 A1 * | 4/2015 | Florek | A47G 1/12 211/13.1 |
| 2015/0320018 A1 * | 11/2015 | Amundson | A01K 51/00 449/6 |
| 2017/0278435 A1 * | 9/2017 | Shea | A47F 5/0815 |
| 2019/0069526 A1 * | 3/2019 | Pielemeier | A01K 47/02 |
| 2019/0082660 A1 * | 3/2019 | Ragsdale | A01K 47/06 |

* cited by examiner

BEEHIVE FRAME STABILIZATION DEVICE

BACKGROUND OF THE INVENTION

1. Field of the Invention

The present invention relates to hives for the housing of bees, and, more particularly, to a device that stabilizes the frames in a beehive.

2. Description of the Related Art

Honey bees use caves, rock cavities and hollow trees as natural nesting sites. In warmer climates they may occasionally build exposed hanging nests. A honeybee nest typically has multiple honeycombs, parallel to each other, with a relatively uniform bee space therebetween. The nest usually has a single entrance. It has been observed that honey bees prefer nest cavities of a moderate size of approximately 40-50 liters in volume. It is also interesting that the bees also seem to prefer that the hive have a location from 3-16 feet height above the ground with an entrance position that tends to face downward and has an equatorial-facing orientation.

Although the word "beehive" is commonly used to describe the nest of any bee colony, scientific and professional literature distinguishes a "nest" from a "hive." Nest used herein will refer to colonies which house themselves in cavities or are hanging and exposed, with "hive" being used to describe an artificial, man-made structure to house the honeybee nest.

The nest's internal structure is a densely packed group of hexagonal prismatic cells made of beeswax, the structure of which is called a honeycomb. The bees use the cells to store food (honey and pollen) and to house the brood (eggs, larvae, and pupae).

Beehives serve as housing for bee colonies that produce honey and pollinate nearby crops. A number of patents have been issued for beehive designs. A key innovation of the design of beehives is the use of vertically hanging frames on which bees build their comb within a box often referred to as a super or a hive body. The design of modern hives is attributed to Rev. Lorenzo Langstroth, with the key structures being a bottom board that has an entrance for the bees, boxes that contain frames for brood and honey (with the lowest box for the queen to lay eggs, and the upper boxes where honey is stored), and an inner cover and top cap providing weather protection.

Langstroth patented his design in the United-States in 1852 and it has become the standard style hive for many of the world's beekeepers. Common features of Langstroth hives is the use of specific bee spaces between frames and other parts so that bees are not likely to glue together nor fill these spaces with comb that would join adjacent frames. The sizes of hive bodies and internal frames are relatively well defined for a particular style, with the rectangular shape of the hive bodies allowing for the stacking of hive bodies to expand the usable space for the bees.

Inside each hive body, frames are hung parallel to each other. The frames are thin rectangular structures made of wood or plastic and typically have a wax or plastic foundation on which the bees draw out the comb. The frames hold the beeswax honeycomb formed by the bees. Eight or ten frames side by side (depending on the size of the box) will fill the hive body, while leaving bee space between each frame and between the end frames and the hive body. A hive frame is a structural element in a beehive that holds the honeycomb or brood comb within the hive box. The hive frame is a key part of the modern movable-comb hive. It allows for the easy removal of the frame in order to inspect the bees for disease or to extract the excess honey.

A proper spacing between the frames is important to maintain so that bee space between adjacent honeycombs or a honeycomb and the side of the box so that additional cells are not inserted and so that the bees have adequate space. The maintenance of spaces is also important when the beekeeper is accessing the hive, so that bees are not damaged or killed in the process.

What is needed in the art is a device that will maintain the frame spacing in a hive body.

SUMMARY OF THE INVENTION

The present invention provides a device to stabilize the frames in a hive body of a beehive to thereby protect the bees from injury or death.

The invention in one form is directed to a beehive including a plurality of hive bodies including a base hive body and at least one upper hive body. There are a plurality of frames positioned in each hive body with a pinning device coupled to a hive body. The hive body has a plurality of holes spaced along a side of the hive body. The pinning device is inserted through at least one of the holes to contact a frame inside the hive body to thereby inhibit shifting of the frame relative to the hive body.

The invention in another form is directed to a pinning device for use with a hive body of a beehive, the pinning device including a structural member, and a plurality of pins extending from the structural member in generally parallel directions.

An advantage of the present invention is that it includes a drilling templet for the holes.

Another advantage is that the pins are tapered for easy insertion.

Yet another advantage is the pinning device is easy to use to modify the hive body for insertion so that all of the frames are stabilized.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
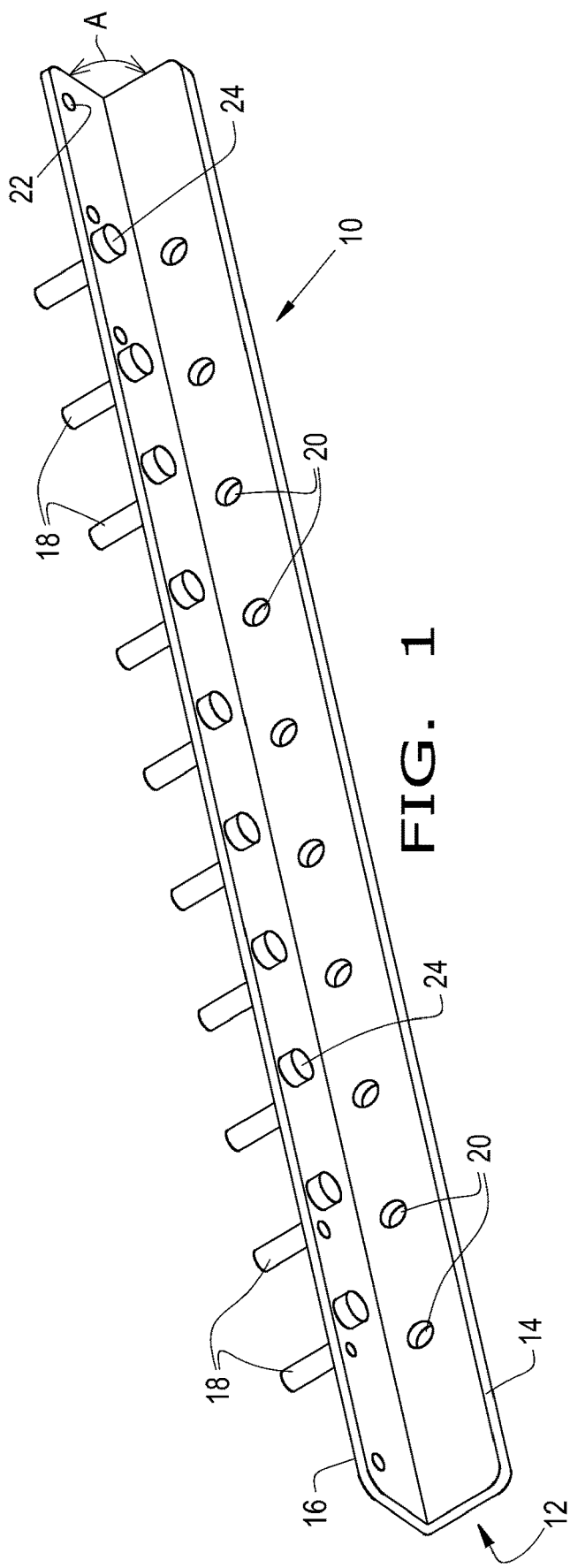
FIG. 1 is a perspective view of an embodiment of a pinning device of the present invention.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Referring now to the drawings, and more particularly to FIG. 1, there is shown an embodiment of a beehive frame stabilization device 10 in the form of a pinning device 10 which generally includes a structural member 12, with limbs 14 and 16, pins 18, holes 20 and 22, and tabs 24. Limbs 14 and 16 are coupled together with and angle A between them. Angle A is shown as 90 degrees. Pins 18 extend from structural member 12 on a side of limb 16, in generally parallel directions. The plurality of pins 18 is illustrated as a quantity of ten pins, which is selected to correspond to a quantity of frames in a hive body.

Structural member 12 has a plurality of holes 20 along limb 14 that corresponds in quantity to the quantity of pins 18. Holes 20 are each spaced apart from each other and pins 18 are each spaced apart from each other at distances that correspond to each other, with the distances therebetween all being equal.

Tabs 24 on limb 16 can also be in the form of a ridge the runs in the direction in which tabs 24 are positioned. Tabs 24 are equal in number and are spaced similar to pins 18 and holes 20.

Figure 2:
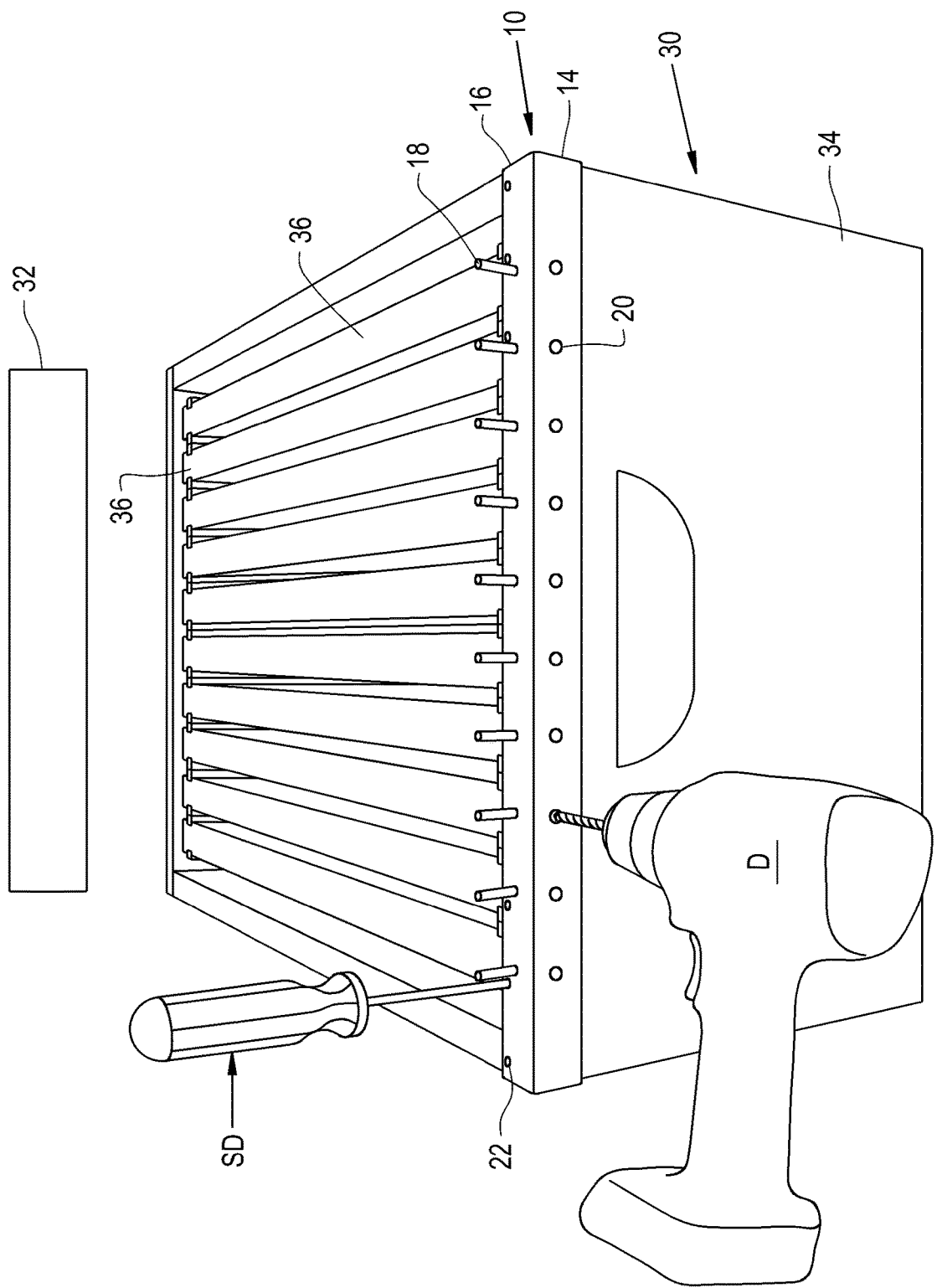
FIG. 2 is a perspective view of a part of a beehive having holes drilled into a hive body through guide holes of the pinning device of FIG. 1.

Now, additionally referring to FIG. 2, there is illustrated a beehive 30 having hive bodies 32 and 34, with hive body 34 being a base hive body 34 and hive body 32 (shown schematically, being an upper hive body 32. There are typically several upper hive bodies 32 placed one on top of the other in a hive 30. The distinction being that the queen bee is usually constrained to remain in the base hive body 34 and the upper hive bodies 32 are used to just store honey, with the worker bees having access to all of the hive bodies 32 and 34.

There as several frames 36 positioned in each hive body 34 (and hive bodies 32 as well), here illustrated as ten frames 36. Pinning device 10 is attached to base hive body 34 by way of fasteners such as screws through holes 22 using a screwdriver SD to position device 10 so that a plurality of holes can be drilled and spaced along a side of the hive body 34, as illustrated being carried out using a drill D.

Figure 3:
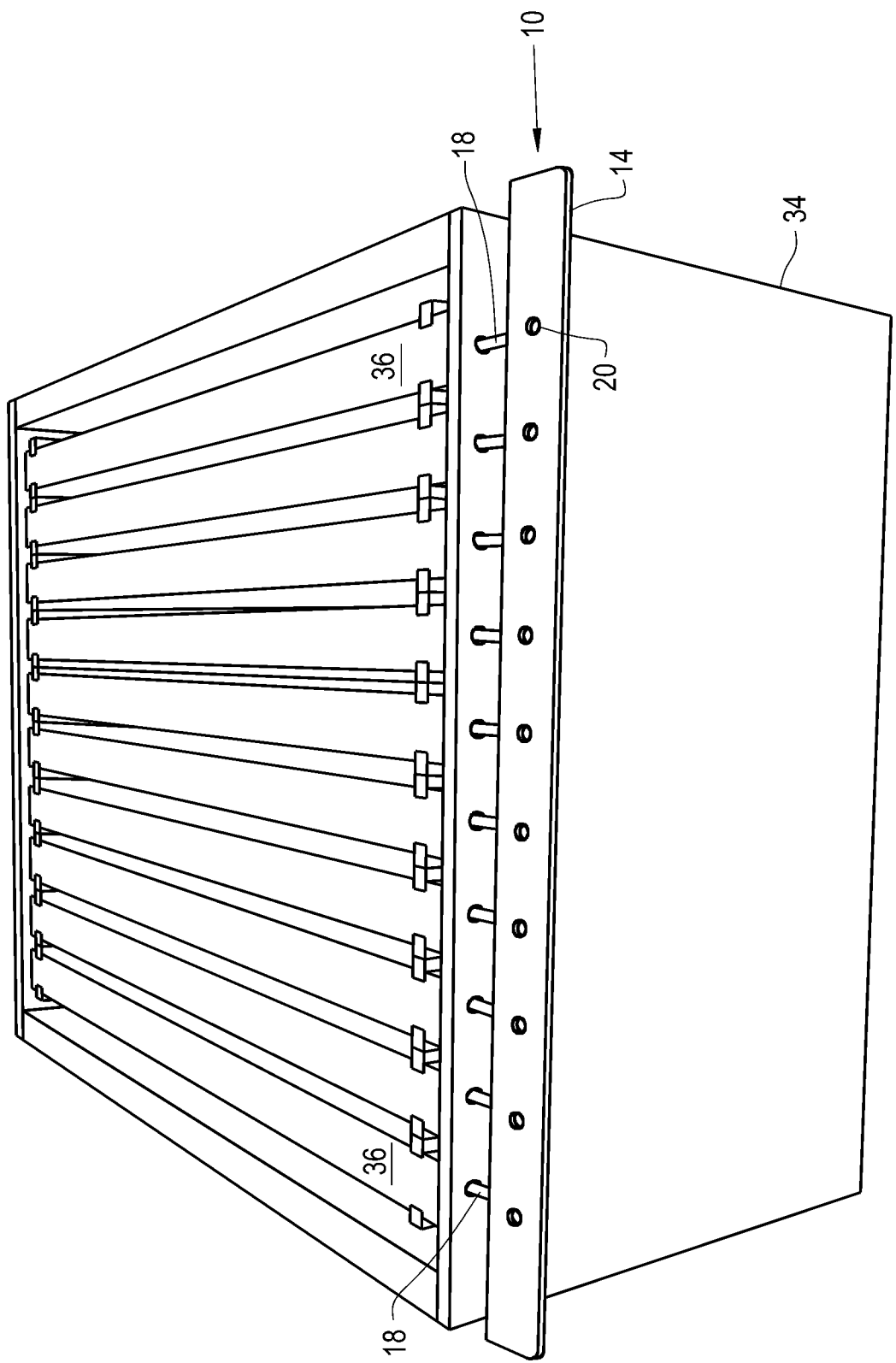
FIG. 3 is another perspective view of hive body of FIG. 2 with the pins of pinning device of FIGS. 1 and 2 being inserted into holes in the hive body.

Pinning device 10 is then disconnected from hive body 34 by removing the screws from holes 22, then pinning device 10 is reoriented, as shown in FIG. 3 with pins 18 being inserted through the holes of the hive body to thereby contact frames 36 inside of hive body 34 to thereby inhibit shifting of the frames 36 relative to hive body 34.

Figure 4:
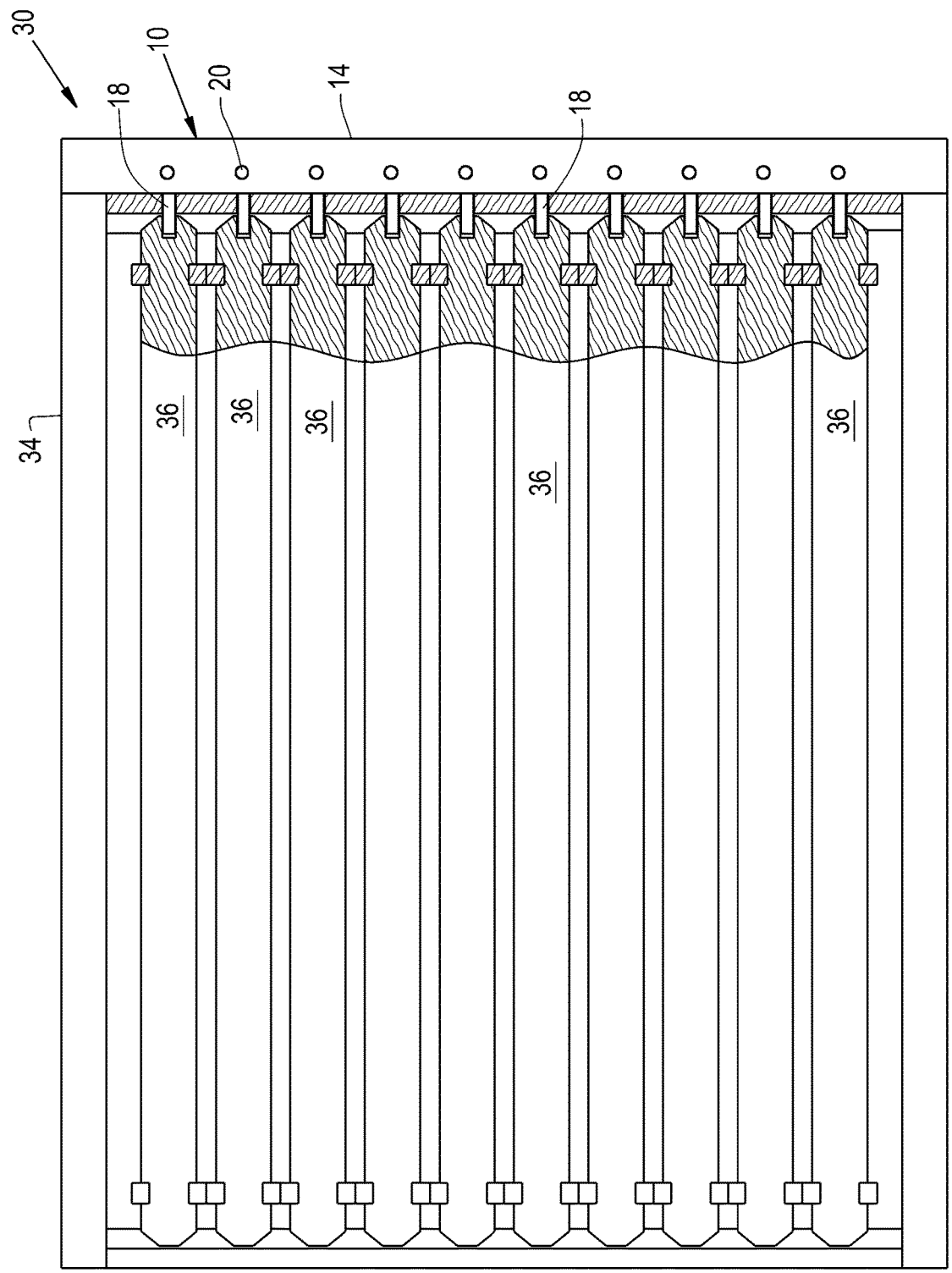
FIG. 4 is a partially sectioned view of the top of the hive body showing the pinning device of FIGS. 1-3 coupled to the hive body, with the pins thereof being through the hive body and contacting a side of corresponding frames in the hive body.

Now, additionally referring to FIG. 4 there is shown a partially sectioned view of how pins 18 contact frames 36. It is contemplated that pins 18 can contact frames 36 to prevent movement of frames 36 that could kill or harm the bees. The way in which pins 18 can carry out this function is by contacting the frames or by being inserted into a hole in the frame created when the drilling operation by way of drill D takes place. It is also alternatively contemplated that the drilling operation could put a groove into the top part of the frame member, which then serves to index the frame 36 to correspond with the position of pin 18.

Figure 5:
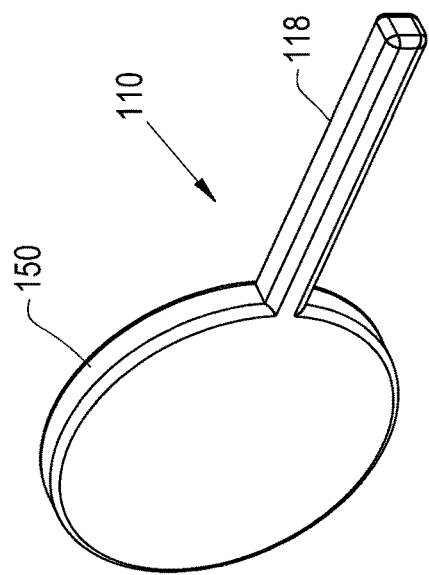
FIG. 5 is a perspective view of another embodiment of a pinning device of the present invention.

Now, additionally referring to FIG. 5 there is illustrated another embodiment of a pinning device 110, having a pin 118 and a handle portion 150. Pin 118 being insertable into one of the holes drilled into the hive body 34 to thereby stabilize the frame, with additional devices 110 being used in other holes as desired.

Figure 6:
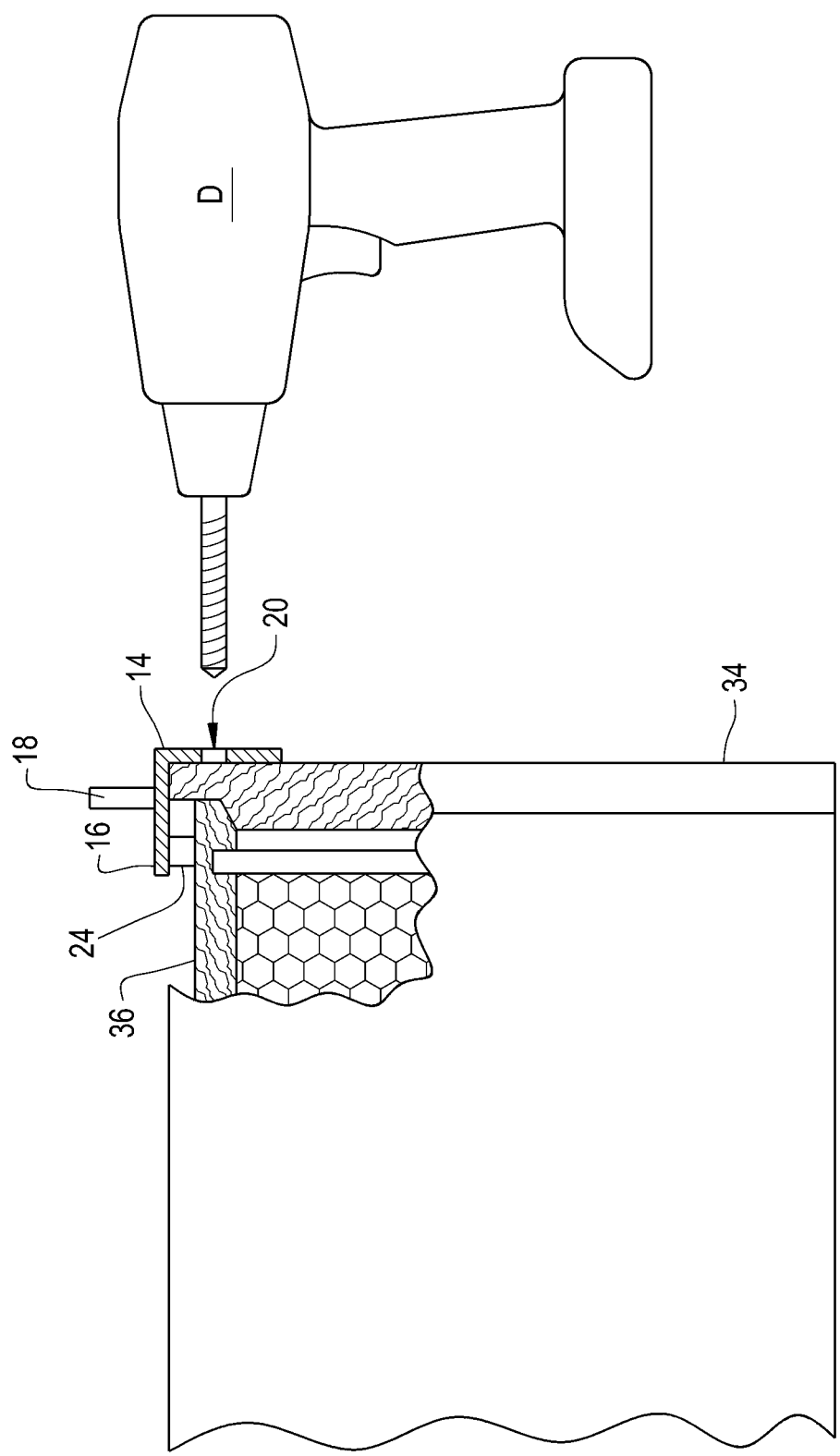
FIG. 6 is a partially sectioned side view of the hive body of FIGS. 2-4 showing the pinning device of FIGS. 1-4 positioned for drilling the side of the hive body with tabs holding down the frames in the hive body.

Now, further referring to FIG. 6, there is a partially sectioned side view with part of the side of hive body 34 removed to show how device 10 is coupled to hive body 34 with tabs 24 holding frames 36 in position for the drilling operation.

Pins 18 can be tapered for the ease of insertion and removal from the holes in the hive body 34. Pinning device 10 can be made from a variety of materials and adapted to the size of any particular hive.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A beehive, comprising:
   a base hive body and at least one upper hive body;
   a plurality of frames positioned in each hive body; and
   a pinning device, the base hive body having a plurality of holes spaced along a side of the base hive body, the pinning device being inserted through at least one of the plurality of holes to contact a frame inside the base hive body to thereby inhibit shifting of the frame relative to the base hive body.

2. The beehive of claim 1, wherein the pinning device includes a pin and a handle portion, the pin being insertable into one of the plurality of holes spaced along the side of the base hive body.

3. The beehive of claim 1, wherein the pinning device includes a plurality of pins all extending from a structural member in generally parallel directions.

4. The beehive of claim 3, wherein the plurality of pins is a quantity of pins that corresponds to the quantity of frames in the base hive body.

5. The beehive of claim 4, wherein the structural member has a plurality of holes along a surface that corresponds to the quantity of pins.

6. The beehive of claim 5, wherein the holes are each spaced apart from each other and the pins are each spaced apart from each other at distances that correspond to each other.

7. The beehive of claim 6, wherein the distances are all equal.

8. The beehive of claim 7, wherein the structural member has two limbs that are at an angle to each other, with the pins being on one limb and the holes being on the other limb.

9. The beehive of claim 8, wherein the angle is a right angle.

10. The beehive of claim 9, wherein the pinning device also includes a ridge or a plurality of tabs on the limb that has the pins attached thereto.

11. The beehive of claim 10, wherein the ridge or the plurality of tabs are on an opposite side of the limb that the pins are on.

12. The beehive of claim 11, wherein the pinning device is attachable to a top of the base hive body and the plurality of holes of the structural member serve as a template for the drilling of holes through the top of the base hive body, the pins of the pinning device are then inserted through the holes that are drilled at the top of the base hive body.

13. The beehive of claim 1, wherein the pinning device includes:
- an angled structural member; and
- a plurality of equally spaced tapered pins extending from the structural member, the base hive body having a plurality of holes drilled through one side having locations that correspond to locations of the tapered pins, the tapered pins extending from the structural member are then inserted into the plurality of holes, at least some of the pins contacting a corresponding frame within the hive body.

* * * * *